US010200602B2

(12) United States Patent
Makita et al.

(10) Patent No.: US 10,200,602 B2
(45) Date of Patent: Feb. 5, 2019

(54) IMAGING APPARATUS, IMAGING CONTROL METHOD, AND COMPUTER PROGRAM

(71) Applicant: SONY MOBILE COMMUNICATIONS INC., Tokyo (JP)

(72) Inventors: Tetsuya Makita, Tokyo (JP); Shigeto Matsuda, Tokyo (JP); Kenji Takagi, Tokyo (JP); Takaaki Nishio, Tokyo (JP); Ryo Nakagawa, Tokyo (JP); Masanori Matsushima, Tokyo (JP)

(73) Assignee: SONY MOBILE COMMUNICATIONS INC., Tokyo (JP)

(*) Notice: Subject to any disclaimer, the term of this patent is extended or adjusted under 35 U.S.C. 154(b) by 182 days.

(21) Appl. No.: 15/429,270

(22) Filed: Feb. 10, 2017

(65) Prior Publication Data

US 2017/0244892 A1 Aug. 24, 2017

(30) Foreign Application Priority Data

Feb. 19, 2016 (JP) ................................ 2016-030247

(51) Int. Cl.
*H04N 5/232* (2006.01)
*H04N 5/225* (2006.01)
*H04N 5/235* (2006.01)
*H04N 5/33* (2006.01)

(52) U.S. Cl.
CPC ....... *H04N 5/23222* (2013.01); *H04N 5/2251* (2013.01); *H04N 5/2256* (2013.01); *H04N 5/2351* (2013.01); *H04N 5/2352* (2013.01); *H04N 5/23241* (2013.01); *H04N 5/23245* (2013.01); *H04N 5/23258* (2013.01); *H04N 5/332* (2013.01)

(58) Field of Classification Search
CPC . H04N 5/23222; H04N 5/2351; H04N 5/2251
USPC ........................................................ 348/135
See application file for complete search history.

(56) References Cited

U.S. PATENT DOCUMENTS

| 2011/0158623 | A1 | 6/2011 | Cheng et al. |
| 2012/0009896 | A1 | 1/2012 | Bandyopadhyay et al. |
| 2014/0014725 | A1 | 1/2014 | Martin et al. |
| 2014/0014726 | A1 | 1/2014 | Tsiopanos et al. |
| 2014/0014727 | A1 | 1/2014 | Choi et al. |

(Continued)

FOREIGN PATENT DOCUMENTS

| JP | 2013-145451 | 7/2013 |
| JP | 2014-207493 A | 10/2014 |

(Continued)

OTHER PUBLICATIONS

Extended European Search Report dated Oct. 30, 2017 in Patent Application No. 17155727.5.

*Primary Examiner* — Nam D Pham
(74) *Attorney, Agent, or Firm* — Xsensus, LLP (57) ABSTRACT

There is provided an imaging apparatus including: a determination unit configured to determine presence or absence of an object in front of an imaging lens on the basis of first sensing data; and a decision unit configured to decide a behavior related to imaging processing through the imaging lens, on the basis of a result of the determination by the determination unit.

18 Claims, 9 Drawing Sheets

(56) References Cited

U.S. PATENT DOCUMENTS

| | | | |
|---|---|---|---|
| 2014/0014728 A1 | 1/2014 | Choi et al. | |
| 2014/0018128 A1 | 1/2014 | Martin et al. | |
| 2014/0283013 A1 | 9/2014 | Marco et al. | |
| 2014/0368626 A1 | 12/2014 | John Archibald et al. | |
| 2014/0368688 A1 | 12/2014 | John Archibald et al. | |
| 2015/0009282 A1* | 1/2015 | Mai ........................ | H04N 7/147 |
| | | | 348/14.12 |
| 2015/0050916 A1 | 2/2015 | Bandyopadhyay et al. | |
| 2015/0341573 A1 | 11/2015 | Matsuo et al. | |
| 2017/0048438 A1 | 2/2017 | Ishikawa et al. | |
| 2017/0070606 A1 | 3/2017 | Bandyopadhyay et al. | |

FOREIGN PATENT DOCUMENTS

| | | |
|---|---|---|
| KR | 10-2015-0133466 A | 11/2015 |
| WO | WO 2015/125409 A1 | 8/2015 |

\* cited by examiner

IMAGING APPARATUS, IMAGING CONTROL METHOD, AND COMPUTER PROGRAM

CROSS REFERENCE TO RELATED APPLICATIONS

This application claims the benefit of Japanese Priority Patent Application JP 2016-030247 filed Feb. 19, 2016, the entire contents of which are incorporated herein by reference.

BACKGROUND

The present disclosure relates to an imaging apparatus, an imaging control method, and a computer program.

A technology has been disclosed in which a user present in the periphery of a screen is detected using a proximity sensor, and processing of a user interface displayed on the screen is performed according to the detection of the user (e.g., see JP 2013-145451A).

SUMMARY

Applying such processing according to detection of an object to an imaging apparatus that performs imaging processing automatically in a state of being hung around a user's neck, for example, improves the quality of imaging processing.

Hence, the present disclosure proposes a novel and improved imaging apparatus, imaging control method, and computer program that are capable of improving quality of imaging processing by detection of an object.

According to an embodiment of the present disclosure, there is provided an imaging apparatus including: a determination unit configured to determine presence or absence of an object in front of an imaging lens on the basis of first sensing data; and a decision unit configured to decide a behavior related to imaging processing through the imaging lens, on the basis of a result of the determination by the determination unit.

According to an embodiment of the present disclosure, there is provided an imaging control method including: determining presence or absence of an object in front of an imaging lens on the basis of first sensing data; and deciding a behavior related to imaging processing through the imaging lens, on the basis of a result of the determination.

According to an embodiment of the present disclosure, there is provided a computer program causing a computer to execute: determining presence or absence of an object in front of an imaging lens on the basis of first sensing data; and deciding a behavior related to imaging processing through the imaging lens, on the basis of a result of the determination.

According to an embodiment of the present disclosure, a novel and improved imaging apparatus, imaging control method, and computer program that are capable of improving quality of imaging processing by detection of an object can be provided.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Embodiment of the present disclosure
　1.1. Overview
　1.2. System configuration example
　1.3. Functional configuration example
　1.4. Operation example
　1.5. Application examples
2. Conclusion

1. Embodiment of the Present Disclosure

1.1. Overview

Before describing an embodiment of the present disclosure in detail, first, description will be given on an overview of an embodiment of the present disclosure.

Equipment, also called wearable devices, assumed to be used worn on the body (e.g., an arm or the head) has become increasingly widespread. A wearable device includes various sensors, a camera, a display device, and the like. Here, a wearable camera, which is a wearable device including a camera, is taken as an example.

Assume a case where a wearable camera that can be worn on the body and perform hands-free imaging processing is given a function of capturing a still image or a moving image by performing processing of capturing a still image or a moving image automatically at predetermined intervals. The function will also be called an interval imaging function below. An ideal operation of a wearable camera with such an interval imaging function is to regularly and automatically capture a still image or a moving image that a user wants to be captured, at timings that seem appropriate to the user.

However, in some cases, the wearable camera captures a still image or a moving image that the user does not want to be captured. For example, there is a case where the wearable camera executes imaging processing in a state where the front of the wearable camera is covered by some sort of object that is unsuitable as a subject in imaging, such as the user's arm or a belt of a bag. An image captured in such a state is an image that the user originally does not want to be captured, and therefore is determined as an unnecessary image by the user after the imaging by the wearable camera. Therefore, when the user looks over the images captured by the wearable camera later, the image determined as an unnecessary image by the user is likely to be deleted, the imaging turning out meaningless. Moreover, if the images captured by the wearable camera are a few images, it is easy for the user to delete an unnecessary image manually when looking over the images later. However, in automatic imaging of performing imaging regularly, the images captured by the wearable camera are large in number, and the user may feel discomfort in only deciding to reject an unnecessary image.

Therefore, if the wearable camera itself can recognize in advance that an image that the user feels unnecessary would be captured if imaging processing is performed at an imaging timing, images that the user feels unnecessary are greatly reduced in number. Configuring the wearable camera not to capture an image that the user feels unnecessary improves the quality of captured images as a whole. In addition, configuring the wearable camera not to capture an image that the user feels unnecessary is expected to have an effect of extending operation time.

Hence, in view of the above points, the present case disclosers carried out extensive studies on a technology in which, in an imaging apparatus that executes imaging processing regularly, the imaging apparatus itself can recognize a situation not requiring imaging. Consequently, the present case disclosers arrived at a technology in which the imaging apparatus itself can recognize a situation not requiring imaging on the basis of sensing data, as described below.

The overview of an embodiment of the present disclosure has been described above. Now, an embodiment of the present disclosure will be described in detail.

1.2. System Configuration Example

Figure 1:
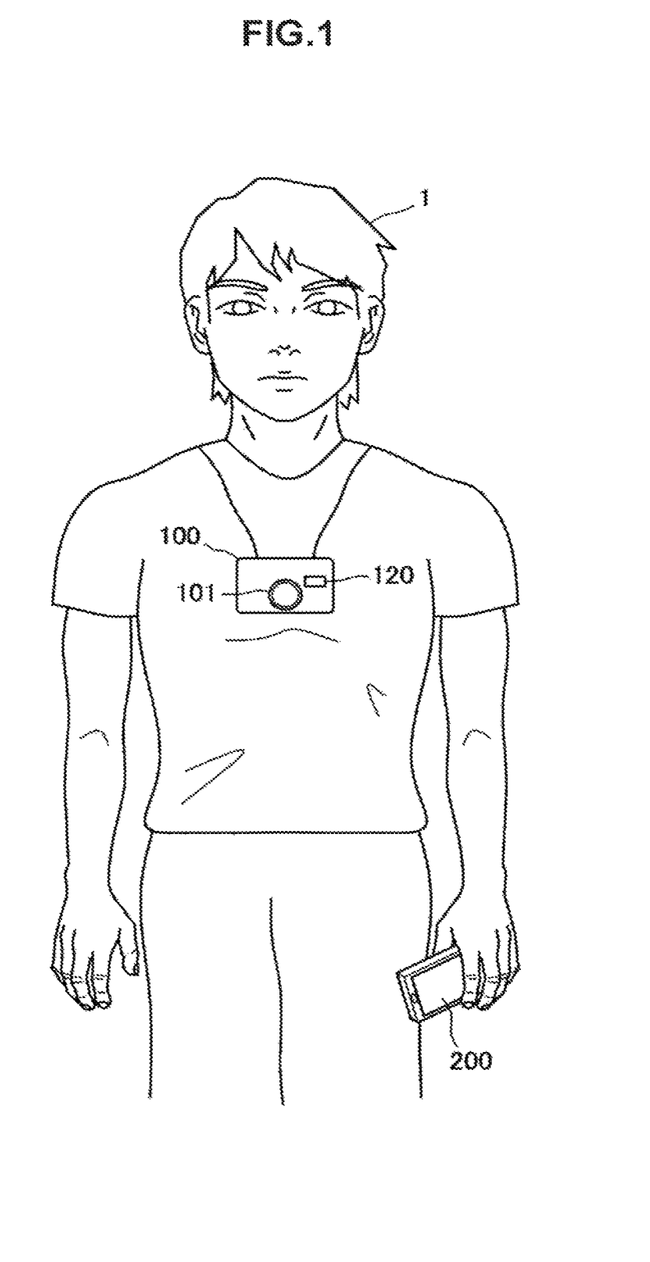
FIG. 1 is an explanatory diagram illustrating a configuration example of an imaging system according to an embodiment of the present disclosure.

First, a configuration example of an imaging system according to an embodiment of the present disclosure will be described. FIG. 1 is an explanatory diagram illustrating a configuration example of an imaging system according to an embodiment of the present disclosure.

As illustrated in FIG. 1, an imaging system according to an embodiment of the present disclosure includes an imaging apparatus 100 and a mobile terminal 200.

The imaging apparatus 100 is assumed to be used hung around a user 1's neck, as illustrated in FIG. 1. Needless to say, the imaging apparatus 100 may be used in a state of being held in the user 1's hand or a state of being placed on a table or the like, as well as being used in the state illustrated in FIG. 1. The imaging apparatus 100 according to the present embodiment has, in addition to a function of capturing a still image or a moving image, a function of capturing a still image or a moving image (hereinafter, a still image or a moving image is simply collectively called an image in some cases) by executing imaging processing at predetermined intervals.

An image captured by the imaging apparatus 100 is transmitted to the mobile terminal 200 possessed by the user 1, to a cloud server via cellular communication, or to home network storage via Wi-Fi, each time imaging processing is completed or at arbitrary timings. The mobile terminal 200 may have, in addition to a function of displaying an image captured by the imaging apparatus 100, a function of changing various settings of the imaging apparatus 100. The mobile terminal 200 is illustrated as a high-performance mobile phone, like a smartphone, in FIG. 1, but is not limited to this example.

The imaging apparatus 100 according to the present embodiment, which executes imaging processing at predetermined intervals as described above, determines presence or absence of some sort of object that is unsuitable as a subject in imaging, at a timing of execution of the imaging processing. The imaging apparatus 100 uses sensing data output by a sensor for the determination of presence or absence of such an object. FIG. 1 illustrates a sensor unit 120 provided on a surface of the imaging apparatus 100, which is the same as the surface provided with a lens 101. Examples of a sensor that constitutes the sensor unit 120 include a distance measuring sensor that measures a distance to an object from the surface of the imaging apparatus 100 that is provided with the lens 101, an illuminance sensor that measures illuminance around the imaging apparatus 100, and a RGB-IR sensor that identifies colors and infrared rays. When detecting presence of some sort of object that is unsuitable as a subject in imaging, at a timing of execution of imaging processing, the imaging apparatus 100 according to the present embodiment waits for execution of imaging processing until the object becomes absent.

In this manner, the imaging apparatus 100 according to an embodiment of the present disclosure determines presence or absence of some sort of object that is unsuitable as a subject in imaging, at a timing of execution of imaging processing; thus, the imaging apparatus 100 itself can recognize a situation not requiring imaging. Then, the imaging apparatus 100 according to an embodiment of the present disclosure temporarily stops imaging in a situation not requiring imaging, thereby greatly reducing the number of images that seem to be unnecessary for the user.

The configuration example of the imaging system according to an embodiment of the present disclosure has been described above. Now, a functional configuration example of the imaging apparatus 100 according to an embodiment of the present disclosure will be described.

1.3. Functional Configuration Example

Figure 2:
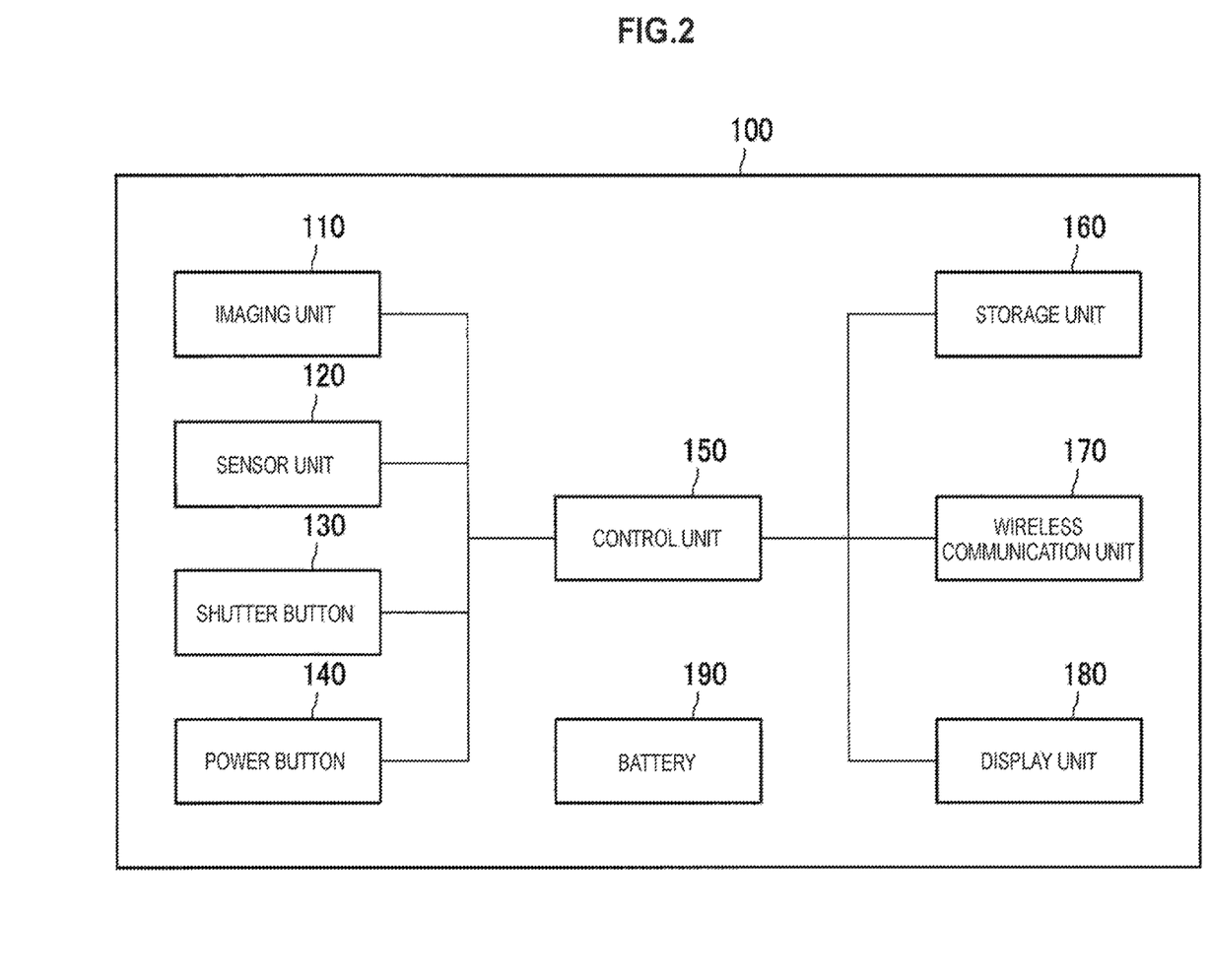
FIG. 2 is an explanatory diagram illustrating a functional configuration example of an imaging apparatus 100 according to an embodiment of the present disclosure.

FIG. 2 is an explanatory diagram illustrating a functional configuration example of the imaging apparatus 100 according to an embodiment of the present disclosure. Hereinafter, a functional configuration of the imaging apparatus 100 according to an embodiment of the present disclosure will be described using FIG. 2.

As illustrated in FIG. 2, the imaging apparatus 100 according to an embodiment of the present disclosure includes an imaging unit 110, the sensor unit 120, a shutter button 130, a power button 140, a control unit 150, a storage unit 160, a wireless communication unit 170, a display unit 180, and a battery 190.

The imaging unit 110 includes the lens 101 illustrated in FIG. 1, an image sensor, and the like, and accumulates electrons for a predetermined period, according to an image that is formed on a light receiving surface of the image sensor through the lens 101. Then, the imaging unit 110 outputs a signal according to the accumulated electrons to the control unit 150. The control unit 150 executes imaging processing using a signal output from the imaging unit 110 to generate an image.

The imaging apparatus 100 according to the present embodiment executes imaging processing at predetermined intervals as described above. In executing imaging processing at predetermined intervals, the image sensor of the imaging unit 110 may be operated only at a timing of the execution of the imaging processing. Operating the image sensor of the imaging unit 110 only at a timing of the execution of the imaging processing reduces the power consumption of the imaging apparatus 100 according to the present embodiment. Note that the imaging apparatus 100 may decide whether to operate the image sensor of the imaging unit 110 only at a timing of the execution of the imaging processing, according to the imaging processing interval. This is because repeating operation and stop of the image sensor when the imaging processing interval is short increases power consumption on the contrary and may shorten operation duration of the imaging apparatus 100.

The imaging apparatus 100 according to the present embodiment may execute imaging processing when the user 1 presses down the shutter button 130, as well as executing imaging processing at predetermined intervals.

The sensor unit 120 is a sensor that outputs sensing data for determining presence or absence of some sort of object that is unsuitable as a subject in imaging, at a timing of execution of imaging processing. As described above, the sensor unit 120 is provided to face the same direction as an imaging direction of the imaging unit 110. As described above, examples of a sensor that constitutes the sensor unit 120 include a distance measuring sensor that measures a distance to an object from the surface of the imaging apparatus 100 that is provided with the lens 101, and an illuminance sensor that measures illuminance around the imaging apparatus 100.

The sensor unit 120 may further include at least one of various sensors, such as an acceleration sensor, a gyro sensor, a geomagnetic sensor, a temperature sensor, a barometric pressure sensor, and a heartbeat sensor. As the distance measuring sensor described above, specifically, a Global Navigation Satellite System (GNSS) receiver and/or a communication device may be included, for example. GNSS may include, for example, Global Positioning System (GPS), Global Navigation Satellite System (GLONASS), BeiDou Navigation Satellite System (BDS), Quasi-Zenith Satellites System (QZSS), and Galileo. Positioning technologies may include, for example, a wireless LAN, Multi-Input Multi-Output (MIMO), cellular communication (e.g., position detection using a mobile base station, a femtocell), and near field communication (e.g., Bluetooth Low Energy (BLE), Bluetooth (registered trademark).

The shutter button 130 is a button that the user presses down in capturing an image. When detecting that the shutter button 130 is pressed down, the control unit 150 executes imaging processing using a signal output from the imaging unit 110 to generate an image. In the case where the imaging apparatus 100 executes an interval imaging function, imaging processing is executed automatically even without the user pushing down the shutter button 130.

The power button 140 is a button that the user operates in powering on or off the imaging apparatus 100. When the imaging apparatus 100 is powered on by the power button 140, power is supplied from the battery 190 to each part of the imaging apparatus 100, and when the imaging apparatus 100 is powered off, power supply from the battery 190 to each part of the imaging apparatus 100 is stopped.

The control unit 150 is configured with a processor, such as a central processing unit (CPU), a ROM, and a RAM, and controls operation of each part of the imaging apparatus 100. In the present embodiment, the control unit 150 determines presence or absence of some sort of object that is unsuitable as a subject in imaging in front of the lens 101 surface of the imaging apparatus 100 by using sensing data output from the sensor unit 120, at a timing of execution of imaging processing. Then, the control unit 150 decides an operation related to imaging processing, according to a determination result of the presence or absence of such an object. That is, when determining that some sort of object that is unsuitable as a subject in imaging is absent, the control unit 150 decides to execute imaging processing, and when determining that some sort of object that is unsuitable as a subject in imaging is present, the control unit 150 decides to interrupt imaging processing until the object becomes absent. A detailed functional configuration example of the control unit 150 will be described later.

The storage unit 160 is configured with, for example, a flash memory or another nonvolatile memory. The storage unit 160 stores an image generated by the control unit 150 executing imaging processing. The image stored by the storage unit 160 is transmitted to the mobile terminal 200 through the wireless communication unit 170 at a predetermined timing.

The wireless communication unit 170 executes wireless communication with another apparatus, such as the mobile terminal 200, or a cloud server on a network by, for example, cellular communication, Wi-Fi, Bluetooth (registered trademark), or Near Field Communication (NFC).

The display unit 180 is a display device configured with, for example, a liquid crystal display, an organic EL display, or an LED display. Display content on the display unit 180 is controlled by the control unit 150.

The battery 190 is configured with a rechargeable secondary battery, and supplies power to each part of the imaging apparatus 100.

The functional configuration example of the imaging apparatus 100 according to an embodiment of the present disclosure has been described above using FIG. 2. Note that the imaging apparatus 100 does not need to include the entire configuration illustrated in FIG. 2. For example, the imaging apparatus 100 does not necessarily include the display unit 180. Moreover, the imaging apparatus 100 may include a structural element other than those illustrated in FIG. 2. For example, the imaging apparatus 100 may include a microphone for recording sound in moving image capturing.

Figure 3:
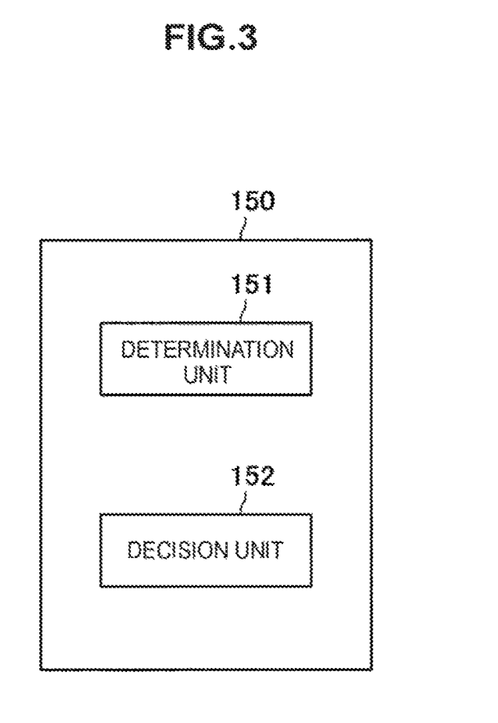
FIG. 3 is an explanatory diagram illustrating a functional configuration example of a control unit 150 included in the imaging apparatus 100 according to an embodiment of the present disclosure.

Now, a functional configuration example of the control unit 150 in FIG. 2 will be illustrated. FIG. 3 is an explanatory diagram illustrating a functional configuration example of the control unit 150 included in the imaging apparatus 100 according to an embodiment of the present disclosure.

As illustrated in FIG. 3, the control unit 150 includes a determination unit 151 and a decision unit 152.

The determination unit 151 determines presence or absence of an object in front of the lens 101, for example, some sort of object that is unsuitable as a subject in imaging, on the basis of sensing data output by a distance measuring sensor, an illuminance sensor, or the like included in the sensor unit 120.

For example, in the case where the distance measuring sensor included in the sensor unit 120 is a sensor capable of detecting a distance to an object in a predetermined range in front of the lens 101 surface, for example, a distance within 30 centimeters from the lens 101 surface, the determination unit 151 can know whether an object is present in the range using sensing data output by the distance measuring sensor.

The decision unit 152 decides a behavior related to imaging processing on the basis of a result of determination by the determination unit 151. For example, while the determination unit 151 determines that some sort of object that is unsuitable as a subject in imaging is present in front of the lens 101, the decision unit 152 decides to stop imaging processing. Then, when the determination unit 151 determines that an object as described above is no longer present in front of the lens 101, the decision unit 152 decides to restart imaging processing.

In addition, the decision unit 152 may decide a behavior related to imaging processing, also on the basis of other sensing data, which is different from sensing data output by the sensing unit 120 and used for the determination unit 151 to determine presence or absence of an object and detect a distance to an object. For example, the decision unit 152 may decide a behavior related to imaging processing also using sensing data output by a gyro sensor that is included in the sensor unit 120 or a portion other than the sensor unit 120. An operation example of the decision unit 152 will be described in detail later.

The imaging apparatus 100 according to an embodiment of the present disclosure can, owing to the above-described configuration, determine presence or absence of some sort of object that is unsuitable as a subject in imaging and detect a distance to an object, at a timing of execution of imaging processing. Since the imaging apparatus 100 according to an embodiment of the present disclosure determines presence or absence of some sort of object that is unsuitable as a subject in imaging and detects a distance to an object, the imaging apparatus 100 itself can recognize a situation not requiring imaging. Then, the imaging apparatus 100 according to an embodiment of the present disclosure temporarily stops imaging in a situation not requiring imaging, thereby greatly reducing the number of images that seem to be unnecessary for the user.

Some users may want to image a short-distance subject using the imaging apparatus 100 in some cases. In such a case, it is inconvenient if imaging processing is not performed when the distance measuring sensor determines that the distance to an object is short. Accordingly, the imaging apparatus 100 may be allowed to have a setting not to perform control based on sensing data obtained by the distance measuring sensor, for the case of imaging a short-distance subject.

The functional configuration example of the control unit 150 included in the imaging apparatus 100 according to an embodiment of the present disclosure has been described above. Now, an operation example of the imaging apparatus 100 according to an embodiment of the present disclosure will be described.

1.4. Operation Example

Figure 4:
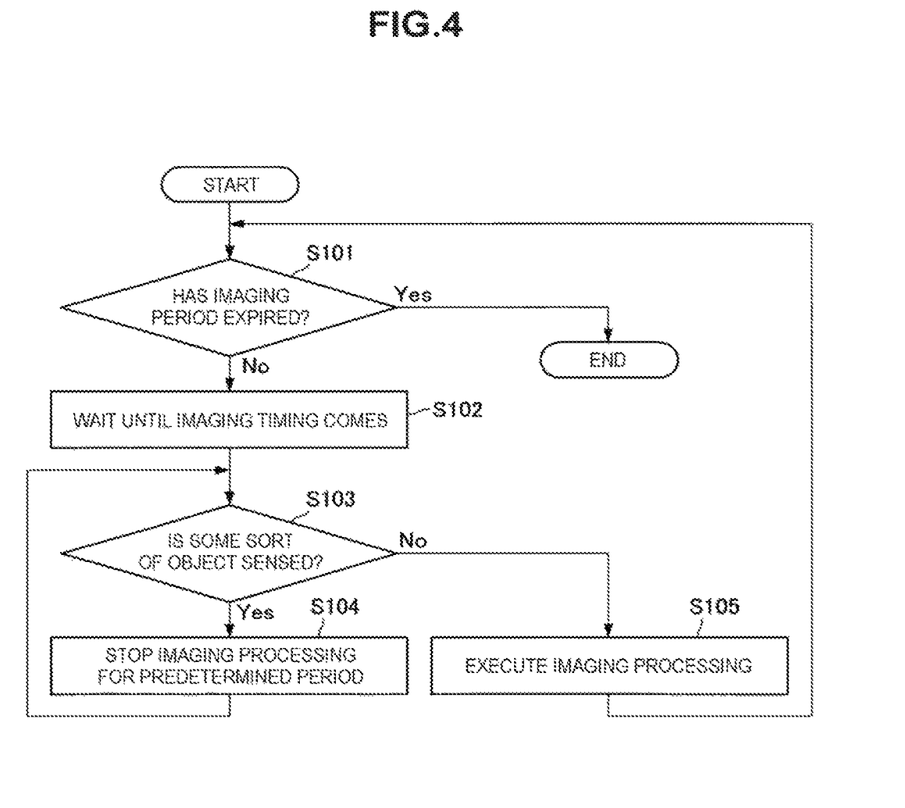
FIG. 4 is a flowchart showing an operation example of the imaging apparatus 100 according to an embodiment of the present disclosure.

FIG. 4 is a flowchart showing an operation example of the imaging apparatus 100 according to an embodiment of the present disclosure. Shown in FIG. 4 is an operation example of the imaging apparatus 100 when the imaging apparatus 100 automatically executes processing of capturing a still image at predetermined intervals. Hereinafter, the operation example of the imaging apparatus 100 according to an embodiment of the present disclosure will be described using FIG. 4.

First, the imaging apparatus 100 determines whether a predetermined imaging period has expired (step S101). This determination in step S101 is executed by the decision unit 152, for example.

When it is determined that the predetermined imaging period has not expired as a result of the determination in step S101 (step S101, No), the imaging apparatus 100 waits until a predetermined imaging timing comes (step S102), and subsequently determines whether some sort of object is present in front of the lens 101, according to content of sensing data output by the sensor unit 120 (step S103). The determination in step S103 is executed by the determination unit 151, for example.

As described above, in the case where the distance measuring sensor included in the sensor unit 120 is a sensor capable of detecting a distance to an object in a predetermined range in front of the lens 101 surface, for example, a distance within 30 centimeters from the lens 101 surface, the determination unit 151 can know whether an object is present in the range using sensing data output by the distance measuring sensor.

Distance measuring sensors include a proximity sensor, a Time of Flight (TOF) sensor, and the like, which are strong in object sensing in respective different ranges. Accordingly, the sensor unit 120 may include a plurality of types of distance measuring sensors. The determination unit 151 may determine whether some sort of object not intended to be imaged is present in the predetermined range in front of the lens 101 surface, by using sensing data output by the plurality of types of distance measuring sensors.

In the case where the sensor unit 120 includes a plurality of types of distance measuring sensors, the imaging apparatus 100 may be allowed to be changed in settings to use only any one of the distance measuring sensors. For example, in the case where the sensor unit 120 includes two types of distance measuring sensors with short-distance and long-distance object sensing ranges, the imaging apparatus 100 may be configured to accept a change in settings from the user to use only either one of the distance measuring sensors. Moreover, for example, in the case where the sensor unit 120 includes three types of distance measuring sensors with short-distance, middle-distance, and long-distance object sensing ranges, the imaging apparatus 100 may be configured to accept a change in settings from the user to use only any one of the distance measuring sensors.

When it is determined that some sort of object is present in front of the lens 101 as a result of the determination in step S103 (step S103, Yes), the imaging apparatus 100 decides to stop imaging processing for a predetermined period (step S104). The processing in step S104 is executed by the decision unit 152, for example. Then, when the predetermined period during which imaging processing is stopped elapses, the imaging apparatus 100 returns to the determination processing in step S103.

On the other hand, when it is determined that some sort of object is absent in front of the lens 101 as a result of the determination in step S103 (step S103, No), the imaging apparatus 100 decides to execute imaging processing, and executes imaging processing (step S105). The decision to execute imaging processing is executed by the decision unit 152, for example. Upon executing the imaging processing, the imaging apparatus 100 returns to the determination processing in step S101.

In executing the imaging processing in step S105, the imaging apparatus 100 may operate the image sensor of the imaging unit 110 immediately before the execution of the imaging processing, and stop the operation of the image sensor when the imaging processing ends. Operating the image sensor of the imaging unit 110 only at a timing of the execution of the imaging processing reduces the power consumption of the imaging apparatus 100 according to the present embodiment.

When it is determined that the predetermined imaging period has expired as a result of the determination in step S101 (step S101, Yes), the imaging apparatus 100 ends automatic imaging processing.

By executing the sequence of operations described above, the imaging apparatus 100 according to an embodiment of the present disclosure can determine presence or absence of some sort of object that is unsuitable as a subject in imaging, on the basis of sensing data, at a timing of execution of imaging processing. By determining presence or absence of some sort of object that is unsuitable as a subject in imaging, the imaging apparatus 100 according to an embodiment of the present disclosure can temporarily stop imaging in a situation not requiring imaging. By temporarily stopping imaging in a situation not requiring imaging, the imaging apparatus 100 according to an embodiment of the present disclosure can greatly reduce the number of images that seem to be unnecessary for the user.

Description will be given on effects that are obtained by the imaging apparatus 100 according to an embodiment of the present disclosure having the configuration described above and executing the sequence of operations described above.

Figure 5A:
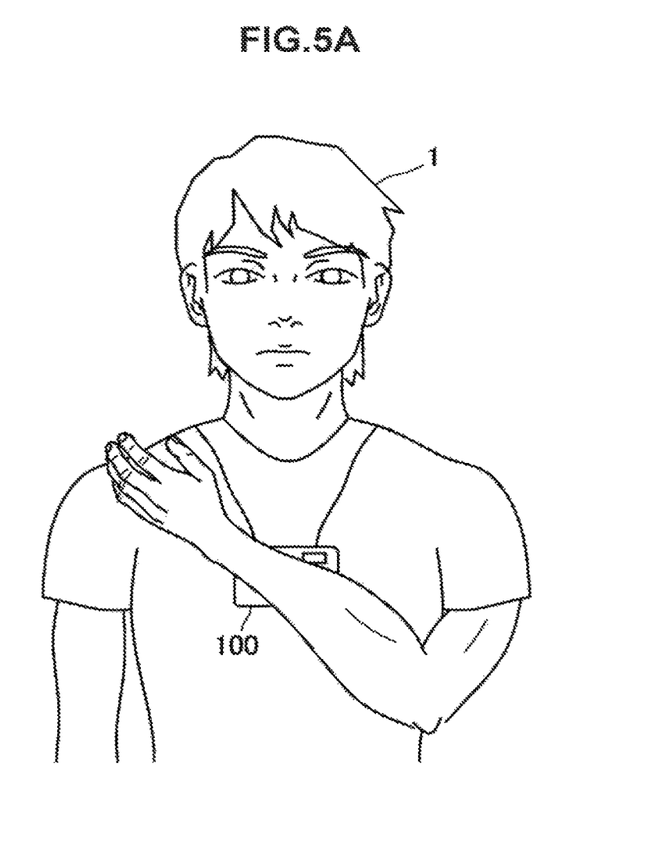
FIG. 5A is an explanatory diagram illustrating a state where a user 1's left arm is positioned in front of a lens 101 of the imaging apparatus 100.
Figure 5B:
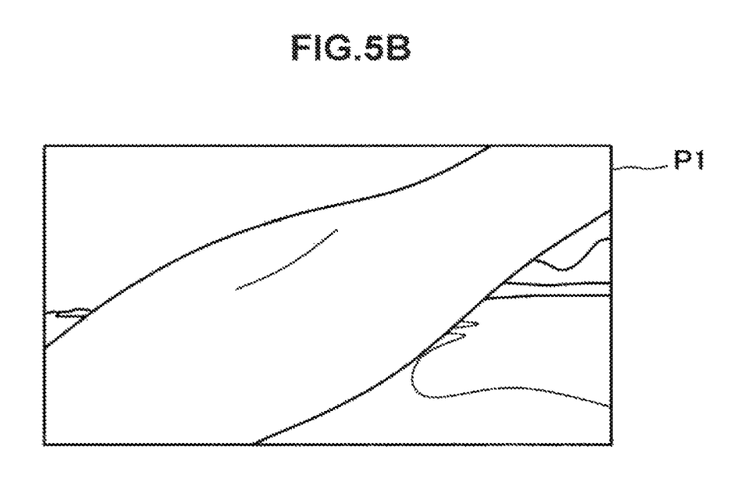
FIG. 5B is an explanatory diagram illustrating an image that is obtained when the imaging apparatus 100 executes imaging processing.

FIG. 5A is an explanatory diagram illustrating a state where the user 1's left arm is positioned in front of the lens 101 of the imaging apparatus 100. FIG. 5B is an explanatory diagram illustrating an image P1 that is obtained when the imaging apparatus 100 executes imaging processing in a state where the user 1's left arm is positioned in front of the lens 101 of the imaging apparatus 100 as in FIG. 5A.

Figure 6A:
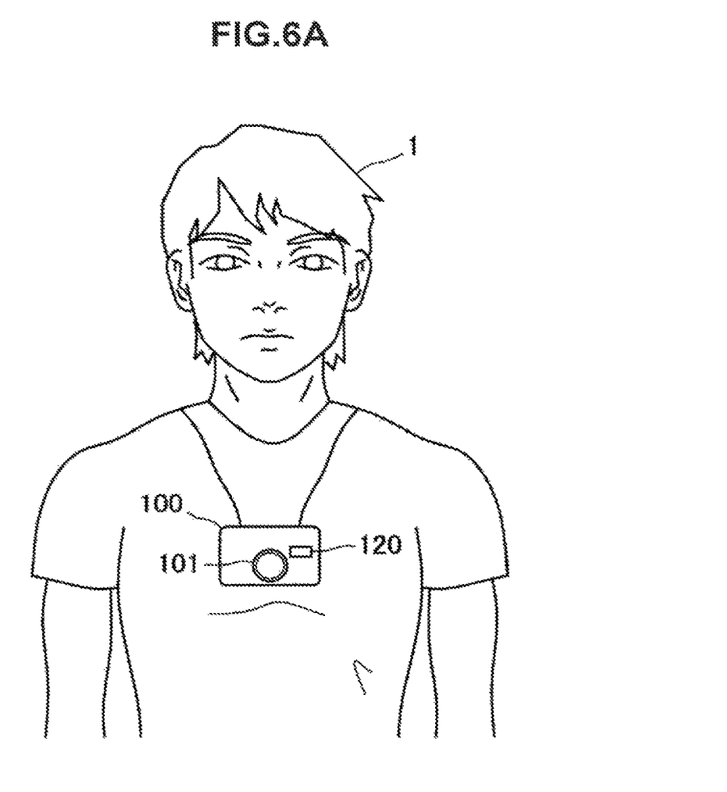
FIG. 6A is an explanatory diagram illustrating a state where an object is absent in a range detectable by a distance measuring sensor, in front of the lens 101 of the imaging apparatus 100.
Figure 6B:
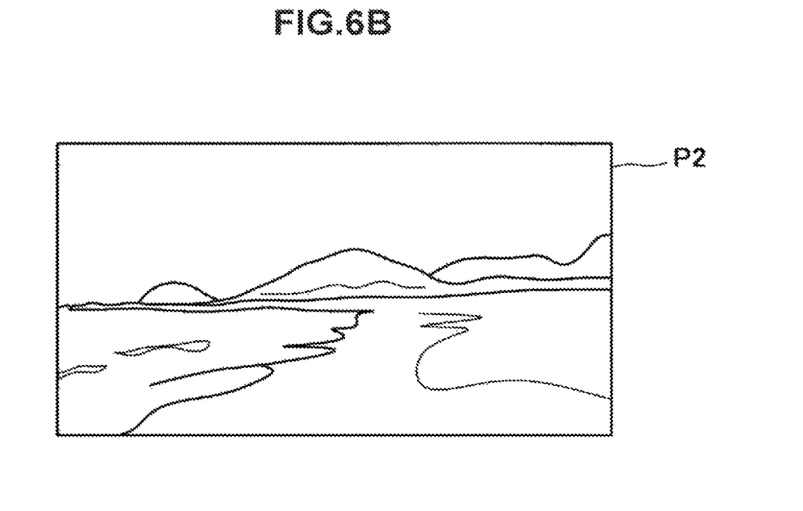
FIG. 6B is an explanatory diagram illustrating an image that is obtained when the imaging apparatus 100 executes imaging processing.

FIG. 6A is an explanatory diagram illustrating a state where an object is absent in a range detectable by the distance measuring sensor, in front of the lens 101 of the imaging apparatus 100. FIG. 6B is an explanatory diagram illustrating an image P2 that is obtained when the imaging apparatus 100 executes imaging processing in a state where an object is absent in a range detectable by the distance measuring sensor, in front of the lens 101 of the imaging apparatus 100, as in FIG. 6A.

The image P1 in which the user 1's left arm appears large, as illustrated in FIG. 5B, is a meaningless image for the user 1, and is highly likely to be deleted by the user 1. To prevent capturing of a meaningless image for the user 1, like the image P1, the imaging apparatus 100 determines presence or absence of some sort of object that is unsuitable as a subject in imaging, on the basis of sensing data, at a timing of execution of imaging processing. By determining presence or absence of some sort of object that is unsuitable as a subject in imaging, the imaging apparatus 100 according to an embodiment of the present disclosure can greatly reduce the possibility of the image P1 illustrated in FIG. 5B being captured, and greatly increase the proportion in which images that are meaningful as images, like the image P2, are captured.

In this manner, by determining presence or absence of some sort of object that is unsuitable as a subject in imaging, the imaging apparatus 100 according to an embodiment of the present disclosure can decide whether to execute imaging processing. Thus, the following effects can also be expected, for example.

Figure 7:
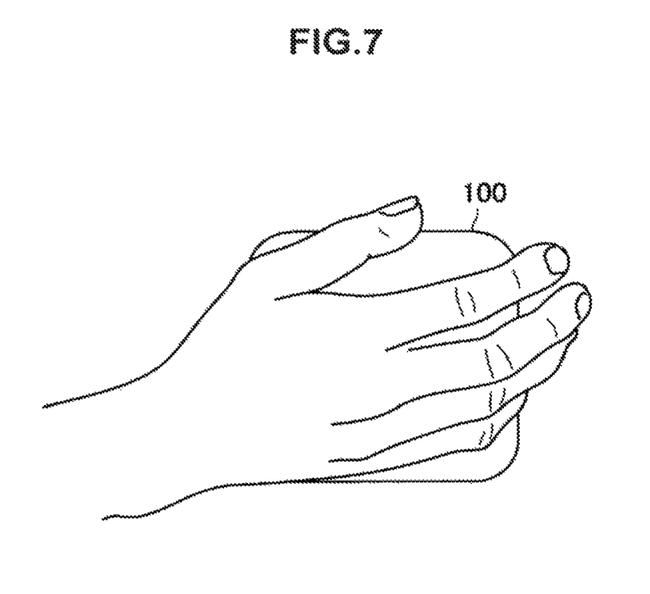
FIG. 7 is an explanatory diagram illustrating the imaging apparatus 100 being covered with a hand.

FIG. 7 is an explanatory diagram illustrating the imaging apparatus 100 being covered with a hand. In a state of being covered with a hand as in FIG. 7, the imaging apparatus 100 detects presence of an object (hand), and thus does not execute imaging processing. That is, the user can stop imaging processing by the imaging apparatus 100 by only covering the imaging apparatus 100 with a hand in a scene where the user does not want an image to be captured (e.g., in a restroom).

Figure 8:
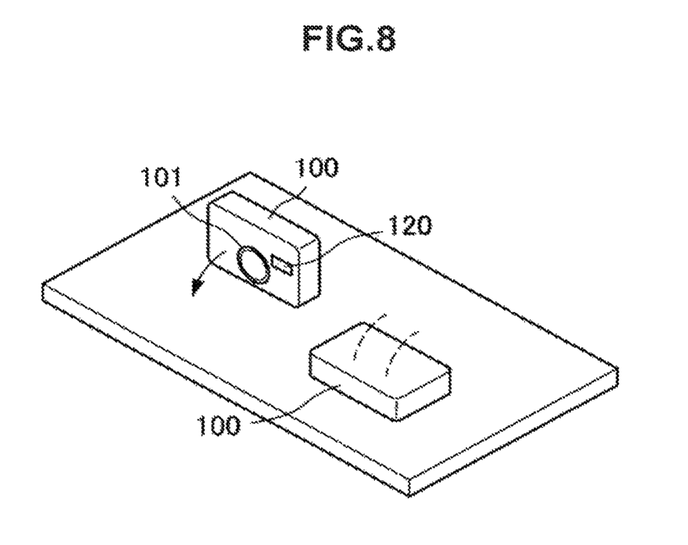
FIG. 8 is an explanatory diagram illustrating a state where the imaging apparatus 100 is placed on a table.

FIG. 8 is an explanatory diagram illustrating a state where the imaging apparatus 100 is placed on a table. The imaging apparatus 100 can execute the interval imaging function even in a state of being placed on the table as in FIG. 8. However, the imaging apparatus 100 may fall by some chance as illustrated on the right side of FIG. 8. If the imaging apparatus 100 continues the interval imaging function in such a state, only pitch-black images would be captured. In other words, if the imaging apparatus 100 falls, a large number of meaningless images would be captured.

Hence, by sensing presence of an object as described above, the imaging apparatus 100 can automatically stop the interval imaging function in the case where the imaging apparatus 100 falls on the table. Accordingly, the imaging apparatus 100 can prevent a large number of meaningless images from being captured in the case where it falls on the table.

Figure 9:
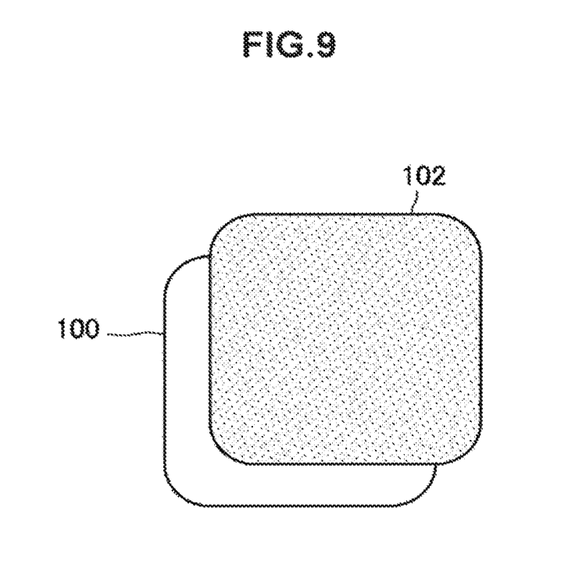
FIG. 9 is an explanatory diagram illustrating a state where a lens cover is put on a lens surface of the imaging apparatus 100.

FIG. 9 is an explanatory diagram illustrating a state where a lens cover 102 is put on the lens 101 surface of the imaging apparatus 100. If the imaging apparatus 100 continues the interval imaging function in the state where the lens cover 102 is put on the lens 101 surface, only pitch-black images would be captured. In other words, if the lens cover 102 is put on the lens 101 surface, a large number of meaningless images would be captured.

Hence, by sensing presence of an object as described above, the imaging apparatus 100 can automatically stop the interval imaging function in a state where the lens cover 102 is put on the lens 101 surface. Accordingly, the imaging apparatus 100 can prevent a large number of meaningless images from being captured in a state where the lens cover 102 is put on the lens 101 surface.

1.5. Application Examples

As described above, the imaging apparatus 100 can decide content of an operation related to imaging processing, on the basis of sensing data output by a sensor for detecting presence of an object. Here, the imaging apparatus 100 can decide, as content of an operation related to imaging processing, an operation other than temporarily stopping the interval imaging function, also on the basis of sensing data output by a sensor that is different from the sensor for detecting presence of an object, which is included in the sensor unit 120.

For example, the decision unit 152 can decide an operation when the distance measuring sensor senses presence of an object, according to content of sensing data output by a gyro sensor or an acceleration sensor that is included in the sensor unit 120 or a portion other than the sensor unit 120.

Figure 10:
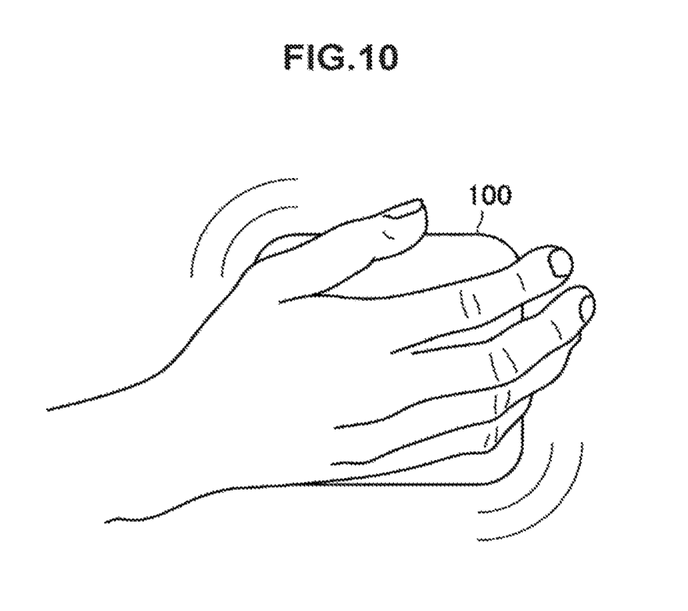
FIG. 10 is an explanatory diagram illustrating the imaging apparatus 100 being covered with a hand and being tapped with the hand.

FIG. 10 is an explanatory diagram illustrating the imaging apparatus 100 being covered with a hand and being tapped with the hand. In such a state, when the distance measuring sensor detects that the imaging apparatus 100 is covered with an object and it is sensed that the imaging apparatus 100 is tapped with the hand by using sensing data output by a gyro sensor or an acceleration sensor, the decision unit 152 powers off the imaging apparatus 100.

Figure 11:
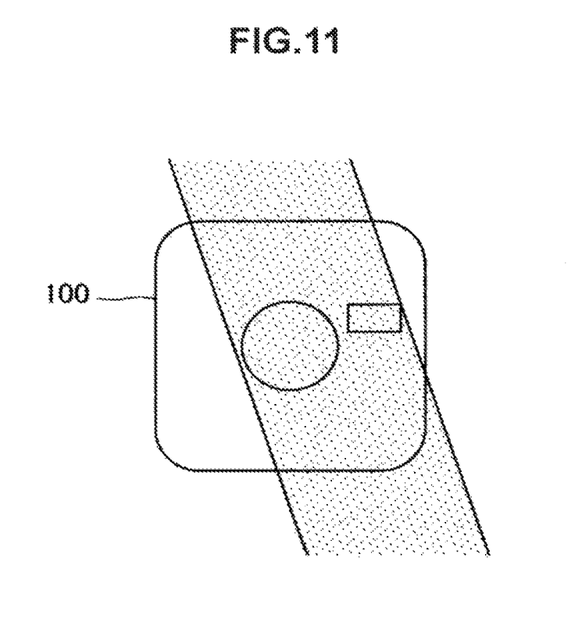
FIG. 11 is an explanatory diagram illustrating the imaging apparatus 100 being covered with a belt of a bag.

FIG. 11 is an explanatory diagram illustrating the imaging apparatus 100 being covered with a belt of a bag. In such a state, when the distance measuring sensor detects that the imaging apparatus 100 is covered with an object but it is not sensed that the imaging apparatus 100 is tapped with a hand by using sensing data output by a gyro sensor or an acceleration sensor, the decision unit 152 keeps the imaging apparatus 100 powered on and temporarily stops the interval imaging function.

In this manner, the imaging apparatus 100 can decide, as content of an operation related to imaging processing, an operation other than temporarily stopping the interval imaging function, also on the basis of sensing data output by a sensor that is different from the sensor for detecting presence of an object, which is included in the sensor unit 120.

The imaging apparatus 100 can decide, as content of an operation, an operation other than temporarily stopping the interval imaging function, such as switching between still image capturing and moving image capturing, transfer of an image saved in the storage unit 160, and switching between capturing of a moving image and recording of only sound in moving image capturing, also on the basis of sensing data output by a sensor that is different from the sensor for detecting presence of an object.

The imaging apparatus 100 may, in place of the distance measuring sensor or in addition to detection by the distance measuring sensor, detect whether an object is present in close proximity in front of the imaging apparatus 100 using an illuminance sensor. In this case, it is possible to configure the imaging apparatus 100 not use a detection function using the illuminance sensor in nighttime, in order to identify whether it is dark because an object is present in close proximity in front of the imaging apparatus 100 or because the user is out at night.

Moreover, the imaging apparatus 100 may, in place of the distance measuring sensor or in addition to detection by the distance measuring sensor, detect the state of a situation in front of the imaging apparatus 100 using a RGB-IR sensor.

2. Conclusion

As described above, according to an embodiment of the present disclosure, there is provided the imaging apparatus 100 that can determine presence or absence of some sort of object that is unsuitable as a subject in imaging, at a timing of execution of imaging processing.

By determining presence or absence of some sort of object that is unsuitable as a subject in imaging, the imaging apparatus 100 according to an embodiment of the present disclosure can temporarily stop imaging in a situation not requiring imaging. By temporarily stopping imaging in a situation not requiring imaging, the imaging apparatus 100 according to an embodiment of the present disclosure can greatly reduce the number of images that seem to be unnecessary for the user.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An imaging apparatus including:
a determination unit configured to determine presence or absence of an object in front of an imaging lens on the basis of first sensing data; and
a decision unit configured to decide a behavior related to imaging processing through the imaging lens, on the basis of a result of the determination by the determination unit.

(2) The imaging apparatus according to (1), wherein the first sensing data is sensing data output from a distance measuring sensor configured to detect a distance to an object in front of the imaging lens.

(3) The imaging apparatus according to (2), including a plurality of the distance measuring sensors having different detectable distances.

(4) The imaging apparatus according to any of (1) to (3), wherein the decision unit stops the imaging processing while the determination unit determines that an object is present in front of the imaging lens.

(5) The imaging apparatus according to any of (1) to (4), wherein the imaging processing is processing of capturing a still image or a moving image of a predetermined period, at predetermined intervals.

(6) The imaging apparatus according to (5), wherein the decision unit operates an image sensor only at a timing of execution of the processing of capturing a still image or a moving image.

(7) The imaging apparatus according to (6), wherein the decision unit decides whether to operate the image sensor only at a timing of execution of the processing of capturing a still image or a moving image, according to an interval of the processing of capturing a still image or a moving image.

(8) The imaging apparatus according to any of (1) to (4), wherein the imaging processing is processing of capturing a moving image.

(9) The imaging apparatus according to any of (1) to (8), wherein the decision unit further decides a behavior related to the imaging processing, on the basis of second sensing data output from a sensor configured to sense an operation assigned to the imaging apparatus.

(10) The imaging apparatus according to (9), wherein the decision unit switches between still image capturing and moving image capturing on the basis of content of the second sensing data.

(11) The imaging apparatus according to (9), wherein the decision unit transmits an image captured on the basis of content of the second sensing data to an external apparatus.

(12) The imaging apparatus according to (9), wherein the decision unit turns off power on the basis of content of the second sensing data.

(13) The imaging apparatus according to (1), wherein the first sensing data is sensing data output from an illuminance sensor configured to detect an illuminance in front of the imaging lens.

(14) The imaging apparatus according to (13), wherein the determination unit refrains from performing determination using sensing data output from the illuminance sensor in a nighttime time slot.

(15) The imaging apparatus according to (1), wherein the first sensing data is sensing data output from a sensor configured to detect a color and infrared light in front of the imaging lens.

(16) The imaging apparatus according to any of (1) to (15), wherein the imaging apparatus is configured to be worn on a body.

(17) An imaging control method including:
determining presence or absence of an object in front of an imaging lens on the basis of first sensing data; and
deciding a behavior related to imaging processing through the imaging lens, on the basis of a result of the determination.

(18) A computer program causing a computer to execute:
determining presence or absence of an object in front of an imaging lens on the basis of first sensing data; and
deciding a behavior related to imaging processing through the imaging lens, on the basis of a result of the determination.

What is claimed is:

1. An imaging apparatus comprising:
circuitry configured to
determine presence or absence of an object unsuitable for imaging in front of an imaging lens on the basis of first sensing data; and
decide a behavior related to imaging processing through the imaging lens on the basis of a result of the determination.

2. The imaging apparatus of claim 1, wherein
the first sensing data is sensing data output from a distance measuring sensor configured to detect a distance to an object in front of the imaging lens.

3. The imaging apparatus of claim 2, comprising:
a plurality of distance measuring sensors having different detectable distances.

4. The imaging apparatus of claim 1, wherein
the circuitry is configured to stop the imaging processing while it is determined that an object unsuitable for imaging is present in front of the imaging lens.

5. The imaging apparatus of claim 1, wherein
the imaging processing is processing of capturing a still image or a moving image of a predetermined period, at predetermined intervals.

6. The imaging apparatus of claim 5, wherein
the circuitry is configured to operate an image sensor only at a timing of execution of the processing of capturing a still image or a moving image.

7. The imaging apparatus of claim 6, wherein
the circuitry is configured to decide whether to operate the image sensor only at a timing of execution of the processing of capturing a still image or a moving image according to an interval of the processing of capturing a still image or a moving image.

8. The imaging apparatus of claim 1, wherein
the imaging processing is processing of capturing a moving image.

9. The imaging apparatus of claim 1, wherein
the circuitry is configured to decide a behavior related to the imaging processing on the basis of second sensing data output from a sensor configured to sense an operation assigned to the imaging apparatus.

10. The imaging apparatus of claim 9, wherein
the circuitry is configured to switch between still image capturing and moving image capturing on the basis of content of the second sensing data.

11. The imaging apparatus of claim 9, wherein
the circuitry is configured to transmit an image captured on the basis of content of the second sensing data to an external apparatus.

12. The imaging apparatus of claim 9, wherein
the circuitry is configured to turn off power on the basis of content of the second sensing data.

13. The imaging apparatus of claim 1, wherein
the first sensing data is sensing data output from an illuminance sensor configured to detect an illuminance in front of the imaging lens.

14. The imaging apparatus of claim 13, wherein
the circuitry is configured to refrain from performing determination using sensing data output from the illuminance sensor in a nighttime time slot.

15. The imaging apparatus of claim 1, wherein
the first sensing data is sensing data output from a sensor configured to detect a color and infrared light in front of the imaging lens.

16. The imaging apparatus of claim 1, wherein
the imaging apparatus is configured to be worn on a body.

17. An imaging control method comprising:
determining presence or absence of an object unsuitable for imaging in front of an imaging lens on the basis of first sensing data; and
deciding a behavior related to imaging processing through the imaging lens on the basis of a result of the determination.

18. A non-transitory computer-readable medium including computer program, which when executed by circuitry, causes the circuitry to execute:
determining presence or absence of an object unsuitable for imaging in front of an imaging lens on the basis of first sensing data; and
deciding a behavior related to imaging processing through the imaging lens on the basis of a result of the determination.

* * * * *